US012640493B2

(12) United States Patent
Blennius

(10) Patent No.: US 12,640,493 B2
(45) Date of Patent: May 26, 2026

(54) ANTENNA STRUCTURE AND METHOD FOR MANUFACTURING THE SAME

(71) Applicant: SAAB AB, Linköping (SE)

(72) Inventor: Martin Blennius, Kullavik (SE)

(73) Assignee: SAAB AB, Linköping (SE)

( * ) Notice: Subject to any disclaimer, the term of this patent is extended or adjusted under 35 U.S.C. 154(b) by 188 days.

(21) Appl. No.: 18/552,707

(22) PCT Filed: Apr. 13, 2022

(86) PCT No.: PCT/SE2022/050368
§ 371 (c)(1),
(2) Date: Sep. 27, 2023

(87) PCT Pub. No.: WO2022/220731
PCT Pub. Date: Oct. 20, 2022

(65) Prior Publication Data

US 2024/0170853 A1 May 23, 2024

(30) Foreign Application Priority Data

Apr. 13, 2021 (SE) .................................... 2100050-0

(51) Int. Cl.
*H01Q 21/00* (2006.01)
*H01Q 21/06* (2006.01)

(52) U.S. Cl.
CPC ..... *H01Q 21/0087* (2013.01); *H01Q 21/0006* (2013.01); *H01Q 21/061* (2013.01)

(58) Field of Classification Search
CPC ........... H01Q 21/0087; H01Q 21/0006; H01Q 21/061; H01Q 1/02; H01Q 1/1207;
(Continued)

(56) References Cited

U.S. PATENT DOCUMENTS 3,016,002 A * 1/1962 Frantz .................... G03B 27/02 355/117
3,544,920 A * 12/1970 Konishi .................. H01P 1/387 333/1.1

(Continued)

FOREIGN PATENT DOCUMENTS

CN 112563734 A 3/2021
EP 4324049 A1 2/2024

OTHER PUBLICATIONS

International Search Report and Written Opinion mailed May 30, 2022 for International Application No. PCT/SE2022/050368, 13 pages.

(Continued)

*Primary Examiner* — Dameon E Levi
*Assistant Examiner* — Jordan E. DeWitt
(74) *Attorney, Agent, or Firm* — Sage Patent Group

(57) ABSTRACT

The present disclosure relates to a method and for manufacturing an antenna structure, the method including providing an antenna plate and a sheet of dielectric including at least one electrical component on a first surface of said sheet of dielectric. Then forming a metal plate, wherein the metal plate includes a cavity structure and further includes a defined curvature around a central axis traversing a central portion of said metal plate. The metal plate also comprises an end angle which is based on an optimal contact-pressure in-between the at least one electrical component and a connecting surface of the antenna plate.

15 Claims, 8 Drawing Sheets

(58) Field of Classification Search
CPC ........ H01Q 13/085; H01Q 1/12; G01S 7/032; H05K 7/20272
See application file for complete search history.

(56) References Cited

U.S. PATENT DOCUMENTS 3,831,396 A * 8/1974 Donaldson ............... B64G 1/58 976/DIG. 188
5,392,053 A * 2/1995 Hirata ...................... H01Q 1/42 343/705
5,437,091 A 8/1995 Norman
5,532,462 A * 7/1996 Butwell ................. H05B 6/707 219/696
10,359,603 B1 * 7/2019 Reardon ................ G02B 7/195
10,903,556 B2 * 1/2021 Lam ...................... H01P 1/2005
10,918,298 B2 * 2/2021 Rogers ................... A61B 5/076
2003/0142461 A1 * 7/2003 Decker .................... H01G 4/30 361/306.3
2004/0041678 A1 * 3/2004 Young ...................... H01G 4/32 336/200
2006/0274992 A1 * 12/2006 Shimura ................... H01P 5/08 385/39
2008/0171182 A1 * 7/2008 Kawate .................. H05K 3/361 428/209
2009/0315796 A1 * 12/2009 Kodama .............. H01Q 21/064 343/772
2011/0043409 A1 2/2011 Kodama
2012/0132952 A1 * 5/2012 Yen .................... H10H 20/8585 257/E33.059
2013/0041235 A1 * 2/2013 Rogers ................... A61B 5/282 600/386
2014/0285383 A1 9/2014 Fakharzadeh et al.
2014/0347154 A1 * 11/2014 Schmelzer .......... H01F 27/2876 336/170
2015/0123749 A1 * 5/2015 Li ........................... H01L 24/00 333/24 R
2019/0181562 A1 6/2019 Shaw et al.
2020/0027916 A1 * 1/2020 Wang .................. H10F 39/8067
2020/0028242 A1 1/2020 Brigham et al.
2020/0222582 A1 * 7/2020 Cezar ..................... A61K 47/36
2020/0251767 A1 * 8/2020 Harrison ........... H01M 10/0585
2021/0244379 A1 * 8/2021 Fujii ........................ A61B 7/02
2022/0181049 A1 * 6/2022 Ahn ......................... H01B 3/30
2022/0352615 A1 * 11/2022 Hollenbeck ........... H01P 11/007
2023/0059024 A1 * 2/2023 Arai ....................... H10N 10/13
2023/0348649 A1 * 11/2023 Xie ....................... C08F 299/08
2024/0014568 A1 * 1/2024 Chahat ................. H01Q 21/005
2024/0170853 A1 * 5/2024 Blennius ............ H01Q 21/0006

OTHER PUBLICATIONS

Extended European Search Report mailed Apr. 15, 2025 for European Patent Application No. 22788546.4, 17 pages.
Partial Supplementary European Search Report mailed Jan. 22, 2025 for European Patent Application No. 22788546.4, 15 pages.
Office Action mailed Apr. 28, 2025 for United Arab Emirates Patent Application No. P6002579/2023, 9 pages.
Office Action, Israel Patent Application No. 307457 mailed Mar. 17, 2026, 5 pages.

* cited by examiner

ANTENNA STRUCTURE AND METHOD FOR MANUFACTURING THE SAME

CROSS-REFERENCE TO RELATED APPLICATIONS

This application is a 35 U.S.C § 371 national stage application for International Application No. PCT/SE2022/050368, entitled "AN ANTENNA STRUCTURE AND METHOD FOR MANUFACTURING THE SAME", filed on Apr. 13, 2022, which claims priority to Swedish Patent Application No. 2100050-0, filed on Apr. 13, 2021, the disclosures and contents of which are hereby incorporated by reference in their entireties.

TECHNICAL FIELD

The present disclosure relates to a method for manufacturing an antenna structure, and an antenna structure.

BACKGROUND ART

Antennas are known in the art and used to convert radio frequency fields into alternating current or converting alternating current in to radio frequency. Antenna arrays with a set of two or more antenna elements are commonly used in various applications to combine or process signals from the antenna array in order to achieve improved performance over that of a single antenna element. For instance they are able to match a radiation pattern to a desired coverage area, changing radiation pattern, adapting to changing signal conditions and some configurations can cover a large bandwidth. Antenna arrays can be described by their radiation patterns and by the type of antenna elements in the system.

A conventional antenna structure comprises antenna elements on an antenna plate mounted to a circuit board. In such an arrangement, particularly in such an arrangement having active electronically scanned array (AESA), slot, notch or patch antennas operating at a high frequency, the available space for components limits the reachable frequency. A component which usually requires relatively large area on the circuit board is the fasteners (e.g. screws or bolts). The fasteners provide the function of allowing the circuit board and the antenna plate to achieve contact pressure so to have sufficient electrical contact, heat transfer as well as environmental robustness. Further, another component that usually requires a large area on a circuit board is the launch pin.

Further, when assembling an antenna plate with a plurality of antenna elements to a circuit board it is challenging to mount it properly in a rapid manner that doesn't hamper the robustness of the structure.

There is room for antenna structures to explore the domain of providing an antenna structure with an improved space efficiency, assembly, and an improved manufacturing convenience while maintaining a high environmental robustness. Further, such an improved antenna structure need to fulfil requirements relating to contact pressure between the antenna plate and the circuit board. There is specifically a lack in the present art of how to improve an antenna structure to obtain space efficiency on the circuit board of the structure while providing a simplified manufacturing, assembly and maintaining contact pressure requirements. Accordingly, there is room for improvements in the art to provide means for such an antenna structure.

Even though some currently known solutions work well in some situations it would be desirable to provide an antenna structure that fulfils requirements related to improving the manufacturing, assembly and space efficiency of an antenna structure.

SUMMARY

It is therefore an object of the present disclosure to provide a method for manufacturing an antenna structure and an antenna structure to mitigate, alleviate or eliminate one or more of the above-identified deficiencies and disadvantages.

This object is achieved by means of a method for manufacturing an antenna structure and an antenna structure as defined in the appended claims.

The present disclosure is at least partly based on the insight that by providing a method for manufacturing an antenna structure and an antenna structure as such, the antenna structure will become more efficient and improved in terms of robustness, cost-efficiency, assembly and manufacturing.

In accordance with the disclosure there is provided a method and an antenna structure in accordance with the appended claims 1 and 14.

The present disclosure discloses a method for manufacturing an antenna structure, the method comprising the steps of: Providing an antenna plate and a sheet of dielectric comprising at least one electrical component on a first surface of said sheet of dielectric. Further, the method comprises the step of, by means of additive manufacturing, forming a metal plate, wherein the metal plate comprises a cavity structure. The formed metal plate further comprises a defined curvature around a central axis traversing a central portion of said metal plate. Moreover, the metal plate comprises an end angle, the end angle being based on an optimal contact-pressure in-between the at least one electrical component and a connecting surface of the antenna plate. Furthermore, the method comprises the steps of arranging the sheet of dielectric in-between the metal plate and the antenna plate and clamping first end portions of the metal plate to second end portions of the antenna plate, so to arrange the metal plate from a first curved state to a second flat state.

A benefit of the method is that it allows for the antenna structure and the metal plate to provide a uniform contact pressure between the sheet of dielectric and the cavity structure and/or the antenna structure without utilizing an excess amount of fastening elements. Thus, increasing the area on the sheet of dielectric, which is a requirement to unlock higher frequencies. Furthermore, by forming the metal plate by means of additive manufacturing a complex structure having cavities may beneficially be formed. Accordingly, the method utilizes additive manufacturing to form a complex metal plate having a curvature.

The metal plate may be a cooling plate having a first cooling surface and a second cooling surface, wherein the cavity structure is positioned intermediate the first and the second cooling surface, wherein the cavity structure is arranged to transfer a flow of cooling medium. Thus, by forming the cooling plate with a curvature allows for an efficient cooling of the sheet of dielectric, while providing sufficient pressure between the sheet of dielectric and the antenna plate. Accordingly, the present method provides for an antenna structure with a uniform contact pressure, over the sheet of dielectric while optimizing cooling of the sheet of dielectric.

The contact pressure may be in the range of 1-100 kPa.

Moreover, the end angle may in the range of 0.5-3.5 degrees. The end angle within said range may provide for a minimized curvature (so to reduce complexity when manufactured by additive manufacturing) of the metal plate but optimizing the contact pressure when the cooling plate is fully mounted.

The at least one electrical component may be a grounding pad. Accordingly, the clamped antenna structure allows for an electrical contact between the grounding pads on the sheet of dielectric and the antenna structure. This facilitates the operating of the antenna structure and further the contact pressure prevents any disharmony of the structure when being under vibrational motion.

The antenna plate may comprise a first elastic stiffness, wherein the metal plate comprises a second elastic stiffness, wherein the first stiffness is greater than the second stiffness.

A benefit of this is that it allows for the antenna plate to not deform, or to deform to a negligible amount, when the metal plate clamped to the antenna plate.

The first end portions of the metal plate and the second end portions of the antenna plate may be clamped by means of a fastening means such as bolts, screws or any other suitable fastening means.

The method may further comprise the step of, preceding forming the metal plate, design a three-dimensional computer aided design, 3D CAD model of the metal plate, import the 3D CAD model into an additive manufacturing, AM apparatus, wherein the 3D CAD model is designed so to provide an optimal end-angle and contact pressure when said metal plate is in said flat state.

The antenna plate may comprise a plurality of antenna elements being slot antenna elements, notch antenna elements, patch antenna elements or any other suitable type of antenna elements.

The method may further comprise the step of, preceding the step of clamping, a thermal interface sheet is arranged in-between the sheet of dielectric and the metal plate. A benefit of this is that it allows for the structure to handle different thicknesses of the sheet of dielectric, while maintaining a sufficient heat transfer.

The method may further comprise the step of press-fit mounting a launch pin in said through-hole via. The launch pin may comprise a conductive element and a dielectric element, wherein the conductive element comprises a first portion comprising a first diameter, the first portion extending towards a second portion comprising a second diameter, the second diameter being greater than the first diameter, wherein the dielectric element sleeves an upper part of the second portion of the conductive element, and wherein a lower part of the conductive element protrudes from an end portion of the dielectric element.

A benefit of this is that it allows for an improved space efficiency on the sheet of dielectric, the launch pin according to the present disclosure comprise a small footprint and is easy to manufacture and assemble. Resulting in an even further improved antenna structure with increased space on the sheet of dielectric for electronic components. This allows for said antenna structure to unlock higher frequencies.

Accordingly, during the step of arranging, the receiving section receives said launch pin. The receiving section may form a conical shape tapering towards the radiating section. Thus, allowing for easier arranging of the launch pin through the receiving section when the metal plate, antenna plate and sheet of dielectric is arranged together. The dielectric element may be circumferentially secured/enclosed to at least a part of the receiving section. Providing the benefit of allowing the dielectric element to be secured within the conical receiving section so to hold the launch pin attached.

There is also provided an antenna structure comprising an antenna plate, and a sheet of dielectric comprising at least one electrical component on a first surface of said sheet of dielectric. The antenna structure further comprises a metal plate formed by additive manufacturing, wherein the metal plate comprises a cavity structure. Moreover, the metal plate further comprises a first curved state and a second flat state. Furthermore, the sheet of dielectric is arranged in-between the metal plate and the antenna plate, wherein the metal plate is in said second flat state, wherein end portions of the metal plate are clamped to second end portions of the antenna plate.

The metal plate may be a cooling plate, thus the present antenna structure provides for sufficient cooling of the sheet of dielectric while also allowing for a space efficient structure.

The antenna plate may comprise a connecting surface facing the sheet of dielectric, the connecting surface may comprise a protruding rim associated with the receiving section wherein said protruding rim is in electrical contact with said grounding pad. The protruding rim may be formed as an extension of the receiving section. The protruding rim allows for a more convenient contact between the grounding pad and the antenna plate. The protruding rim combined with the attachment of the metal plate allows for a simplified mounting and improved contact pressure between the antenna plate and the grounding pad when mounted. Thus, providing an antenna structure being more robust and insensitive against vibrations and other disturbing means.

According to some embodiments, the lower part of the launch pin is attached to the sheet of dielectric by means of soldering from a back surface of the sheet of dielectric, the back surface being on an opposite side of the sheet of dielectric relative to the mounting surface.

Further, the dielectric element of the launch pin may comprise a third diameter, wherein the third diameter is 2-3 times greater than the first diameter, so to obtain a 50 ohm impedance.

The lower part of the conductive element may form an interference relative the through-hole via, so to allow press-fit mounting of the launch pin into the through-hole via.

BRIEF DESCRIPTION OF THE DRAWINGS

In the following the disclosure will be described in a non-limiting way and in more detail with reference to exemplary embodiments illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided method and antenna structure, it will be apparent to one skilled in the art that the antenna structure and the method may be realized without these details. In other instances, well known constructions or functions are not described in detail, so as not to obscure the present disclosure.

Figure 1:
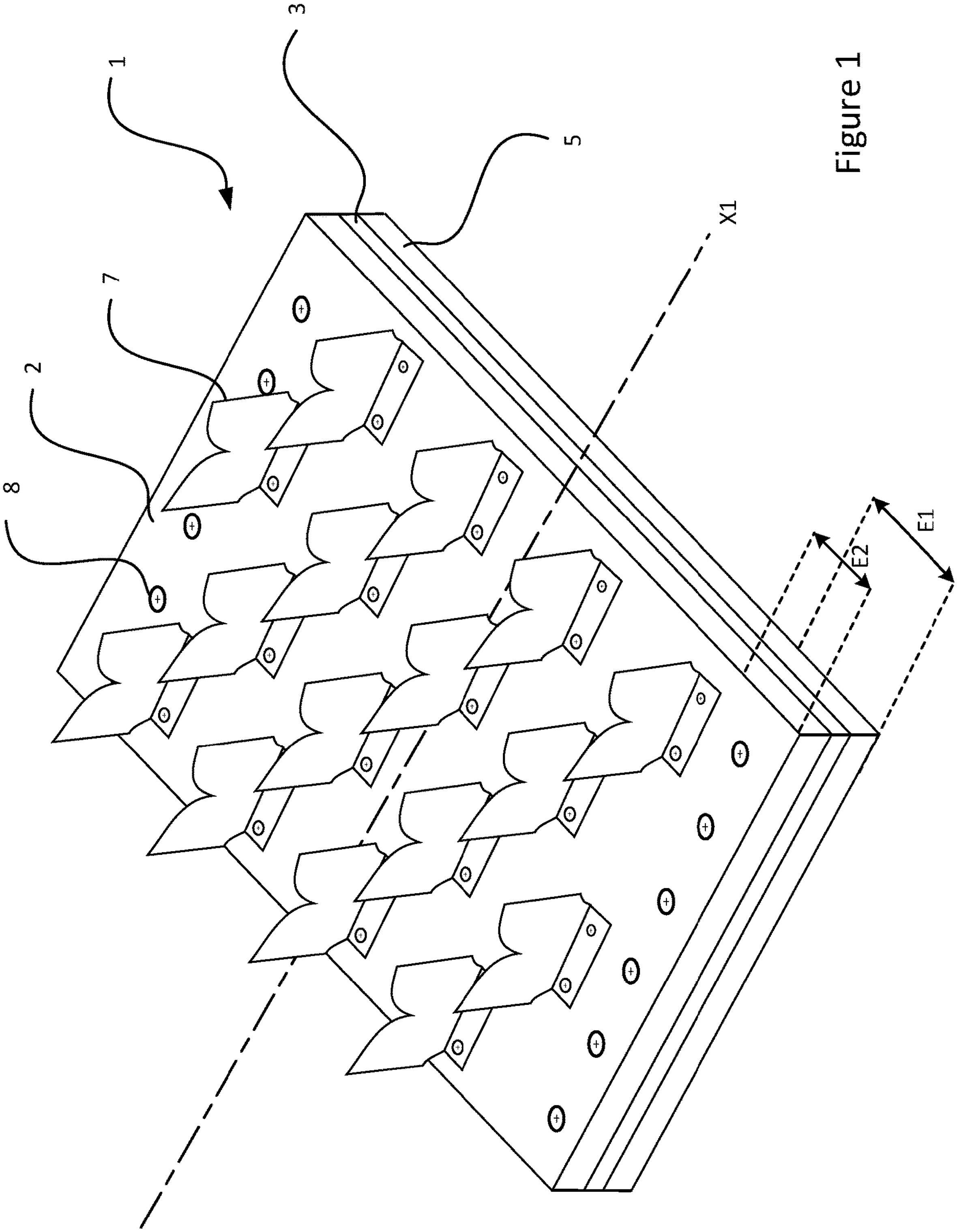
FIG. 1 illustrates an antenna structure from an objective view in accordance with an embodiment of the present disclosure.

FIG. 1 illustrates an objective view of an antenna structure 1 comprising an antenna plate 2 having a plurality of antenna elements 7, and a sheet of dielectric 3 comprising at least one electrical component 11 (see FIG. 5A) on a first surface 4 of said sheet of dielectric 3. The antenna elements 7 may be slot antenna elements, notch antenna elements, patch antenna elements or any other suitable type of antenna elements.

The antenna structure 1 further comprises a metal plate 5 formed by additive manufacturing, wherein the metal plate 5 comprises a cavity structure 13 (see FIG. 2), wherein the metal plate further 5 comprises a first curved state and a second flat state. The sheet of dielectric 3 is arranged in-between the metal plate 5 and the antenna plate 2. As seen in FIG. 1, when the antenna structure 1 is assembled the metal plate 5 is in said second flat state, first end portions E1 of the metal plate 5 are clamped to second end portions E2 of the antenna plate 2. The metal plate 5 is clamped to the antenna structure so as to sandwich the sheet of dielectric 3. The transition of the metal plate 5 from the first state to the second state obtained by clamping the metal plate 5 to the antenna plate 2 allows for a contact pressure between the sheet of dielectric 3 and the antenna plate 2.

By forming the metal plate 5 in a first curved state by means of additive manufacturing (3D printing), the metal plate 5 may have a complex inner structure while achieving the curved structure.

The antenna structure 1 in accordance with the present disclosure provides the benefit of allowing for a sufficient contact pressure between the electrical component and the sheet of dielectric 3 as well as reducing the need for excess fastening means 8 penetrating the antenna structure 1, metal plate 5 and the sheet of dielectric 3. The contact pressure may be in the range of 1-100 kPa. The contact pressure results in electrical contact between the electrical component 11 and the antenna plate 2 while also making the structure 1 less sensitive to vibrations.

Figure 2:
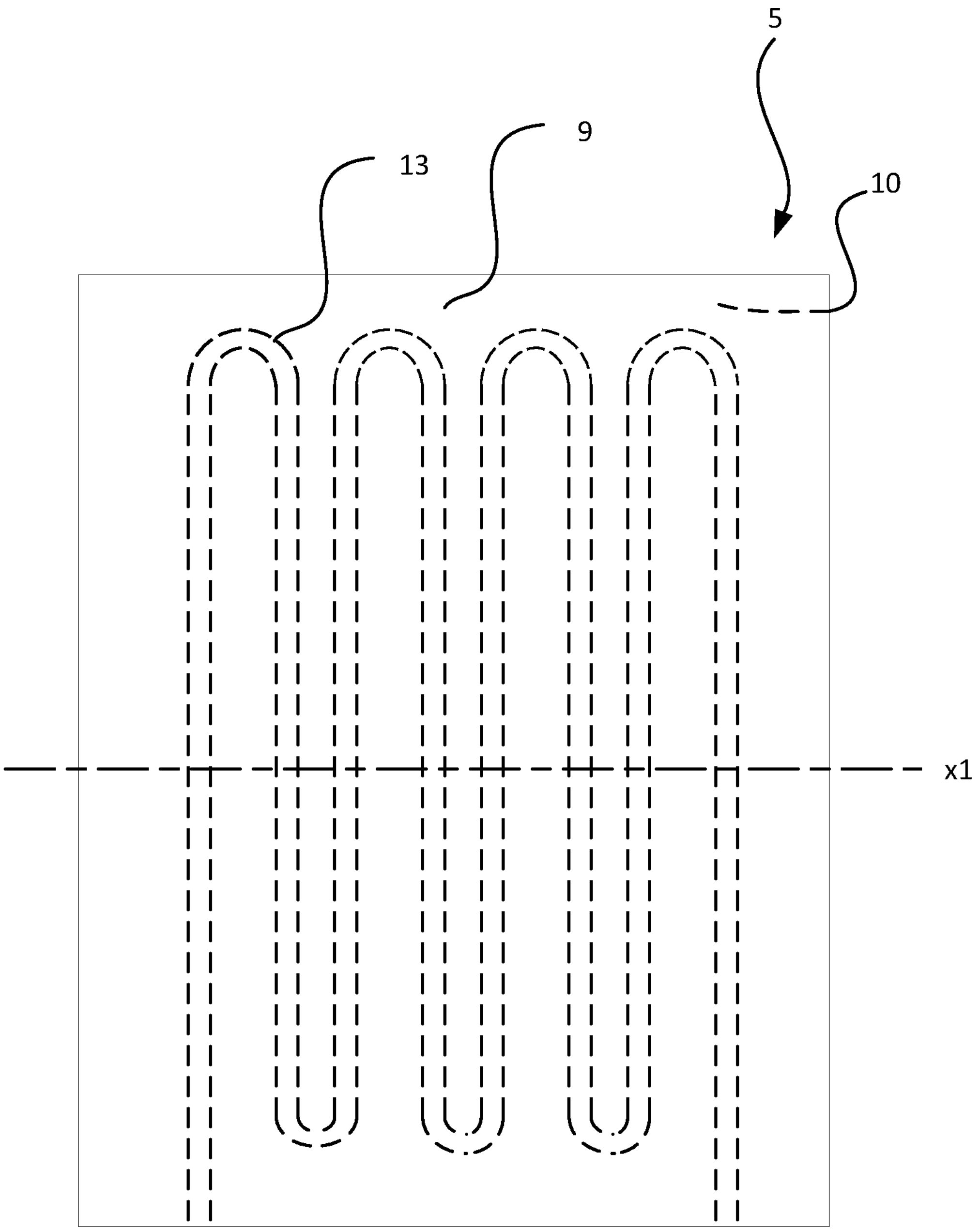
FIG. 2 illustrates a metal plate from a front view, the metal plate having an internal cavity structure in accordance with an embodiment of the present disclosure.

FIG. 2 shows the metal plate 5 from a front view wherein the metal plate 5 is a cooling plate having a first cooling surface 9 and a second opposing cooling surface 10, wherein the cavity structure 13 is positioned intermediate the first and the second cooling surface 9, 10, wherein the cavity 13 is arranged to transfer a flow of cooling medium. The form of the cavity structure 13 is not limited to the form as shown in FIG. 2. The cavity structure 13 may have any suitable form/structure that allows for a transfer of a cooling medium so to cool the antenna structure.

A benefit of having the metal plate 5 in the form of a cooling plate is that, since the metal plate 5 is attached to a surface of the sheet of dielectric 3, it allows for it to be in vicinity to said sheet 3 resulting in less risk of overheating any electrical components 11 (i.e. a more efficient cooling) on the sheet of dielectric 3. Further, the metal plate 3 allows for the functioning as both a support structure for the antenna structure 1 and a cooling structure, fulfilling multiple functions. Consequently, the present disclosure provides a compact antenna structure 1 while maintaining performance.

Figure 3:
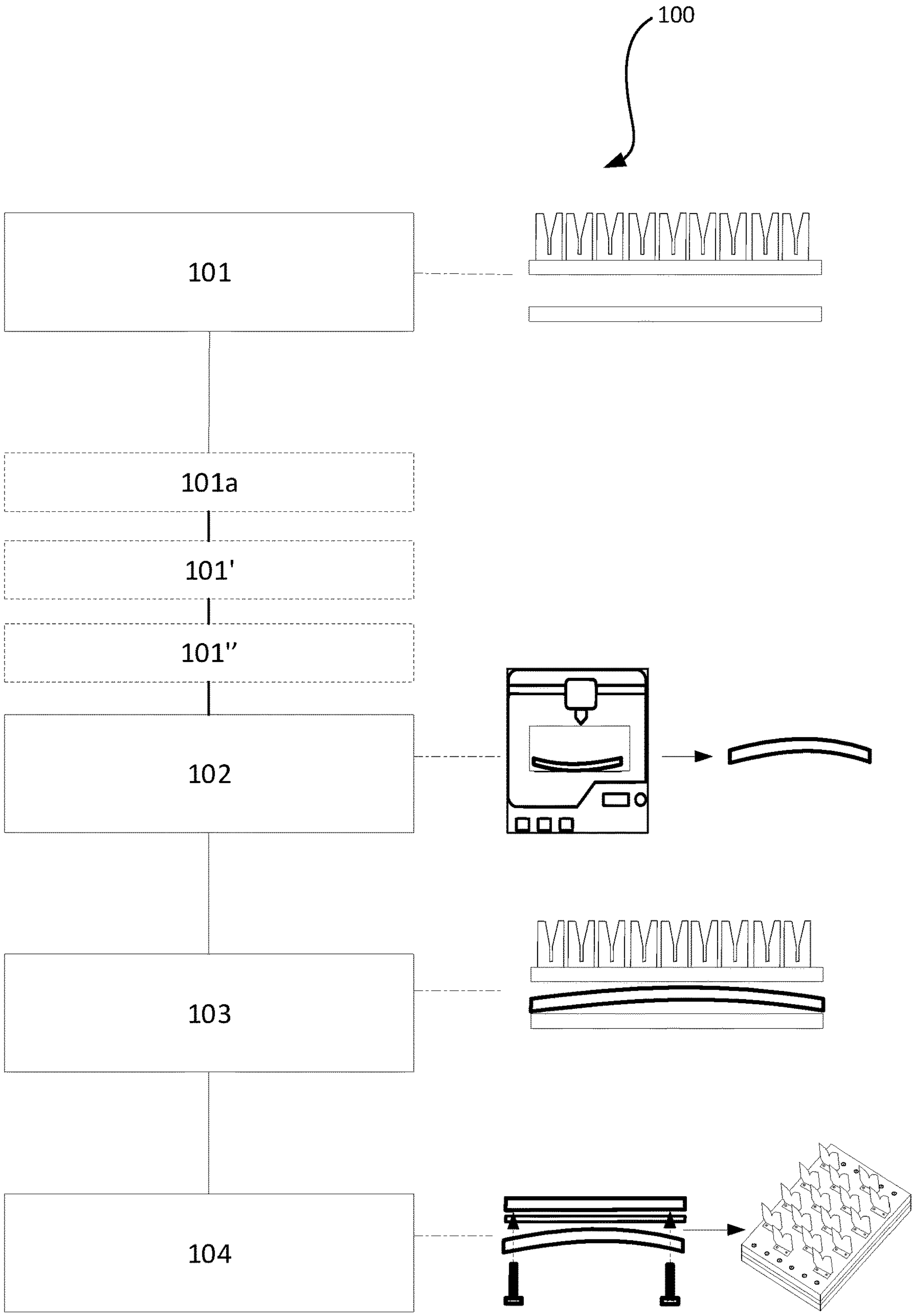
FIG. 3 schematically illustrates a method for manufacturing an antenna structure in accordance with an embodiment of the present disclosure.

FIG. 3 illustrates a method 100 for manufacturing an antenna structure, the method 100 comprising the steps of: providing 101 an antenna plate 2 and a sheet of dielectric 3 comprising at least one electrical component on a first surface 4 of said sheet of dielectric 3. Further, the method 100 comprises the step of, by means of additive manufacturing: forming 102 a metal plate 5, wherein the metal plate 5 comprises a cavity structure 13. The metal plate 5 further comprises a defined curvature around a central axis x1 traversing a central portion of said metal plate 5. Furthermore, metal plate 5 comprises an end angle α (see FIG. 4A), the end angle α being based on an optimal contact-pressure in-between the at least one electrical component 11 and a connecting surface 12 of the antenna plate 2. Further, the method 100 comprise the step of arranging 103 the sheet of dielectric 3 in-between the metal plate 5 and the antenna plate 2. Moreover, the method 100 comprise the step of clamping 104 first end portions E1 of the metal plate 5 to second end portions E2 of the antenna plate 2 (end portions explicitly seen in FIG. 4A), so to arrange the metal plate 5 from a first curved state to a second flat state.

As further shown in FIG. 3, the method 100 may further comprise the step of, preceding forming 102 the metal plate 5, design 101' a three-dimensional computer aided design, 3D CAD model of the metal plate 5 and import 101" the 3D CAD model into an additive manufacturing, AM apparatus.

Figure 6:
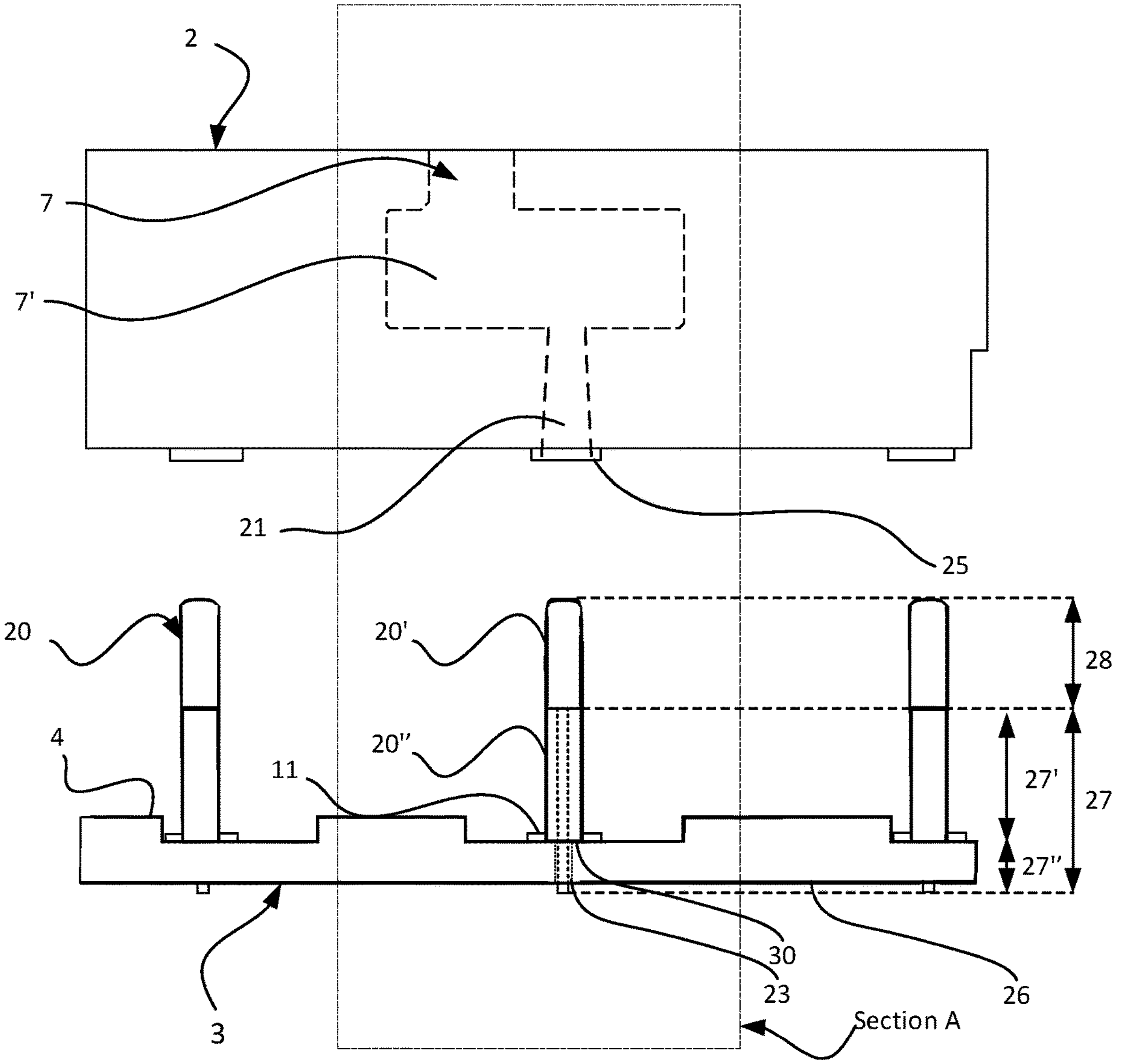
FIG. 6 illustrates from a side view a cut-out portion of an antenna plate and a sheet of dielectric prior to mounting, the sheet of dielectric comprising a launch pin, wherein a section A shows the inner structure of the antenna plate, launch pin and the sheet of dielectric.
Figure 7:
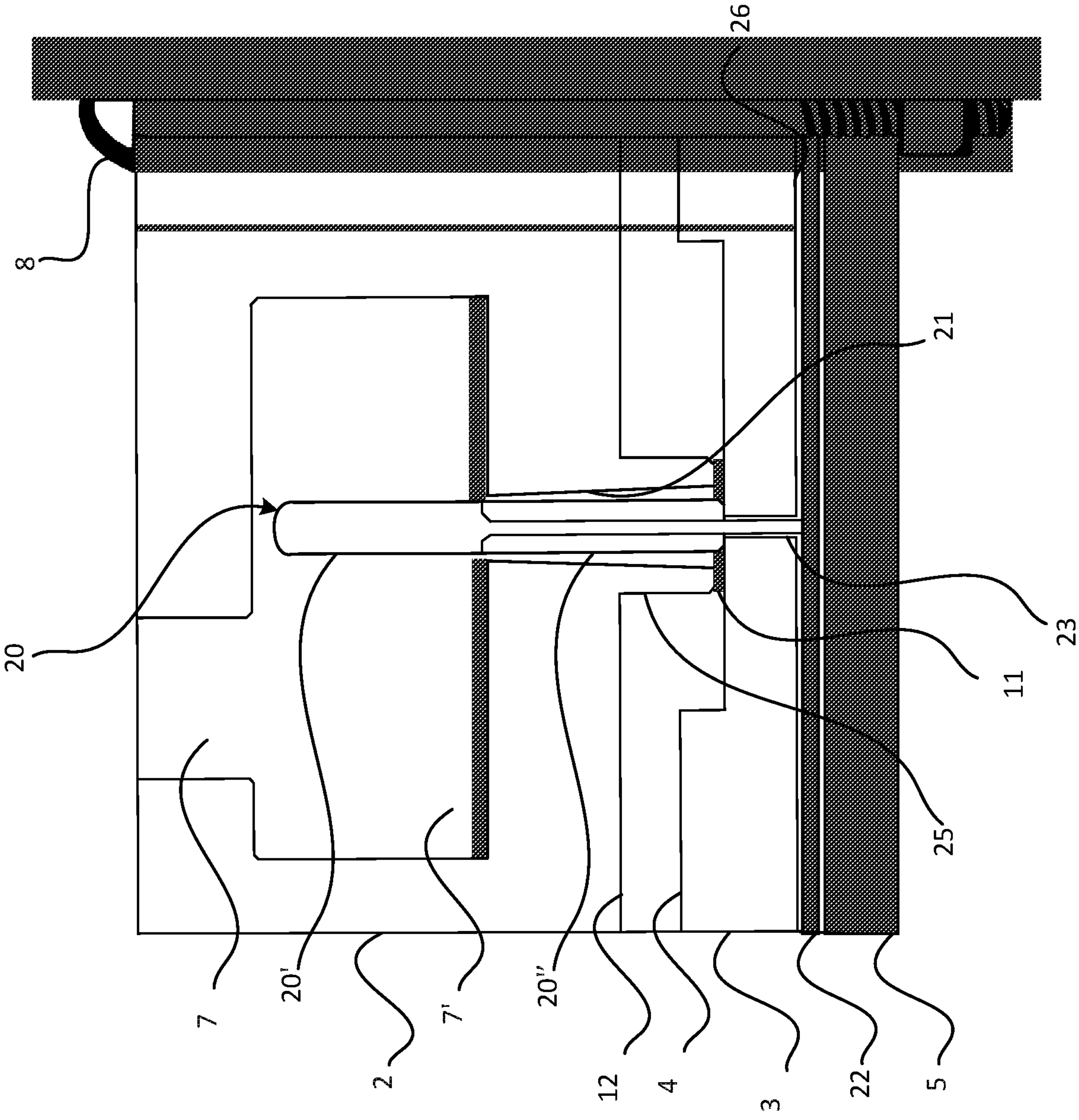
FIG. 7 illustrates from a side cross-sectional view of a cut-out portion of a mounted antenna structure.

The method 100 may further comprise the step of, prior to clamping 104, press-fit mounting a launch pin 20 into a through hole via 23 in the sheet of dielectric 3 (see launch pin in FIGS. 6 and 7).

Figure 4B:
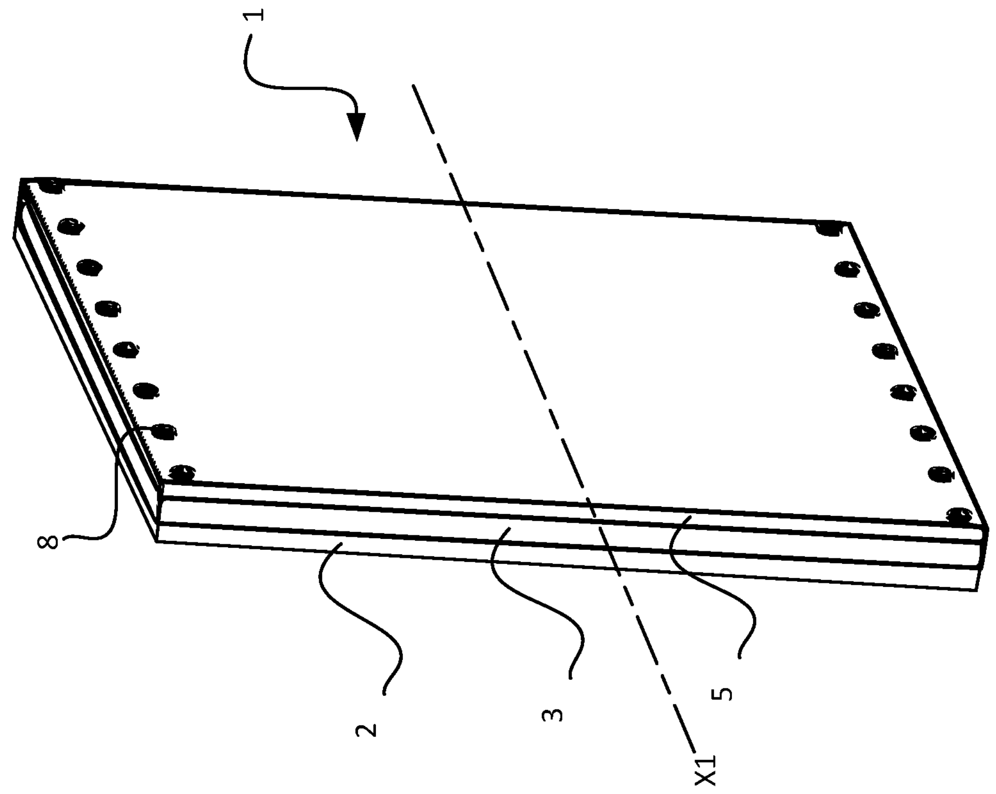
FIG. 4B illustrates an antenna structure from an objective view after clamping the metal plate to the antenna plate in accordance with an embodiment of the present disclosure, wherein the metal plate is in a second flat state.
Figure 4A:
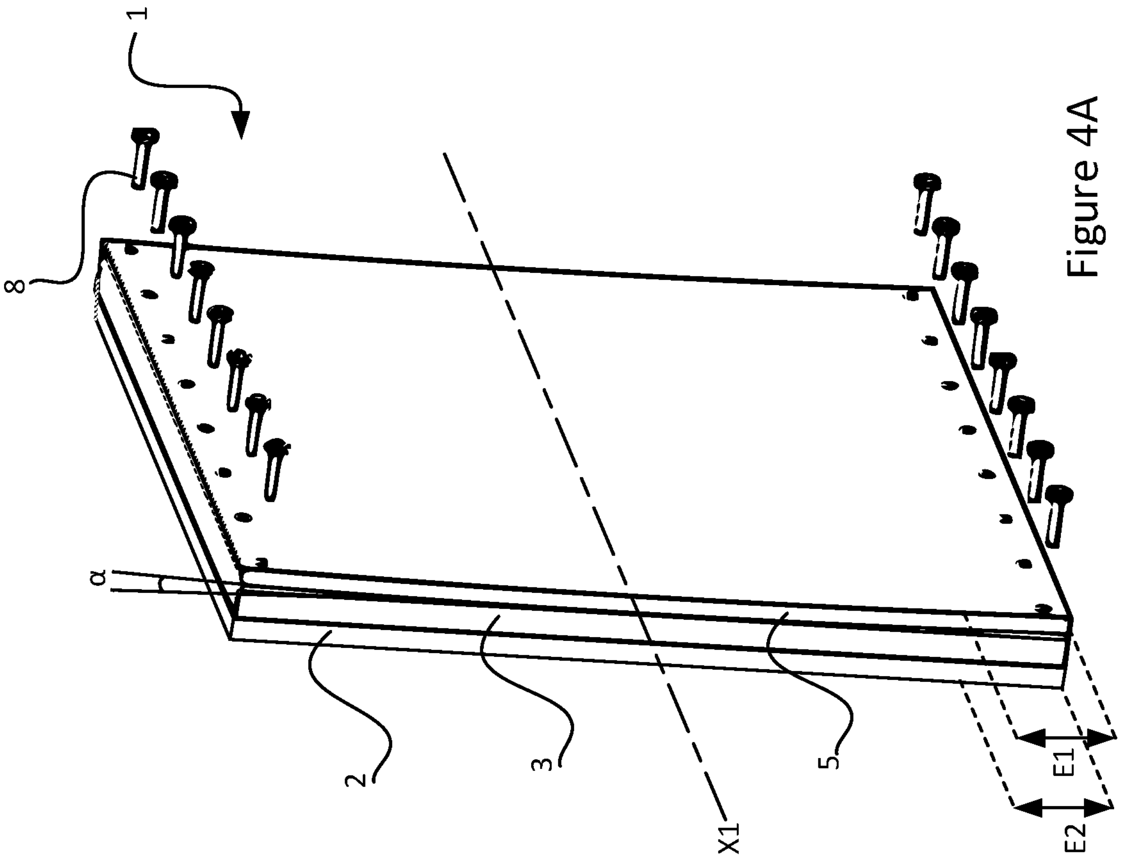
FIG. 4A illustrates an antenna structure from an objective view prior to assembly, in accordance with an embodiment of the present disclosure, wherein the metal plate is in a first curved state.

FIGS. 4A and 4B illustrate an objective view of the antenna structure 1, with the metal plate 5 in the first and the second state. FIG. 4A illustrates the antenna structure 1 prior to the step of clamping 104 the first end portions E1 of the metal plate 5 to second end portions E2 of the antenna plate 2. It should be noted that the antenna elements 7 are not shown in FIGS. 4A and 4B however, they may have antenna elements 7.

It is illustrated in FIG. 4A that the metal plate 5 is in a first curved state, wherein the metal plate 5, in said first curved state comprises a defined curvature around a central axis x1 traversing a central portion of said metal plate 5. As further seen in FIG. 4A, the metal plate 5 comprises an end angle α, the end angle α being based on an optimal contact-pressure in-between the at least one electrical component 11 and a connecting surface 12 of the antenna plate 2. The optimal contact pressure may be determined by calculating an end angle α which allows the antenna plate 2 to apply a specific pressure (e.g. 100 kpa) to the sheet of dielectric 3 when the metal plate 5 is clamped to said antenna plate 2 (sandwiching the sheet of dielectric). Thus, the term "optimal contact pressure" may refer to the pressure that will be applied and allow for an electrical contact between the at least one electrical component 11 and the connecting surface 12 (when in flat state, from curved state), further the optimal contact pressure also provides the benefit of prohibiting any performance drops on the antenna structure 1 even during e.g. vibration. Accordingly, the optimal contact pressure may be a pressure based on factors comprising robustness enhancement and electrical contact enhancement. It is further illustrated in FIG. 4A that the fastening means 8 is a bolt. However the fastening means 8 may be any other suitable type of fastening means e.g. screws. It should be noted that the fastening means 8 does not necessarily need to penetrate the sheet of dielectric 3. According to some embodiments it penetrates the sheet of dielectric 3, according to some embodiments it only penetrates (clamps) the metal plate 5 and the antenna plate 2. In other words, the sheet of dielectric 3 may be clamped between the metal plate 5 and the antenna plate 2 without having any fastening means penetrating the sheet of dielectric 3. However in such a case the sheet of dielectric 3 may have a shorter length compared to the metal plate 5 and the antenna plate 2.

FIG. 4A illustrates the first end portions E1 of the metal plate 5 and the second end portions E2 of the antenna plate 2 prior to the step of being clamped 104 by means of a fastening means 8. The end angle α may be in the range of 0.5-3.5 degrees.

FIG. 4B illustrates the antenna structure 1 after the step of clamping 104 the metal plate 5 to the antenna plate 2. After the step of clamping 104 the metal plate 5 to the antenna plate 2, the metal plate 5 forms a second flat state as shown in FIG. 4*b*.

Figure 5A:
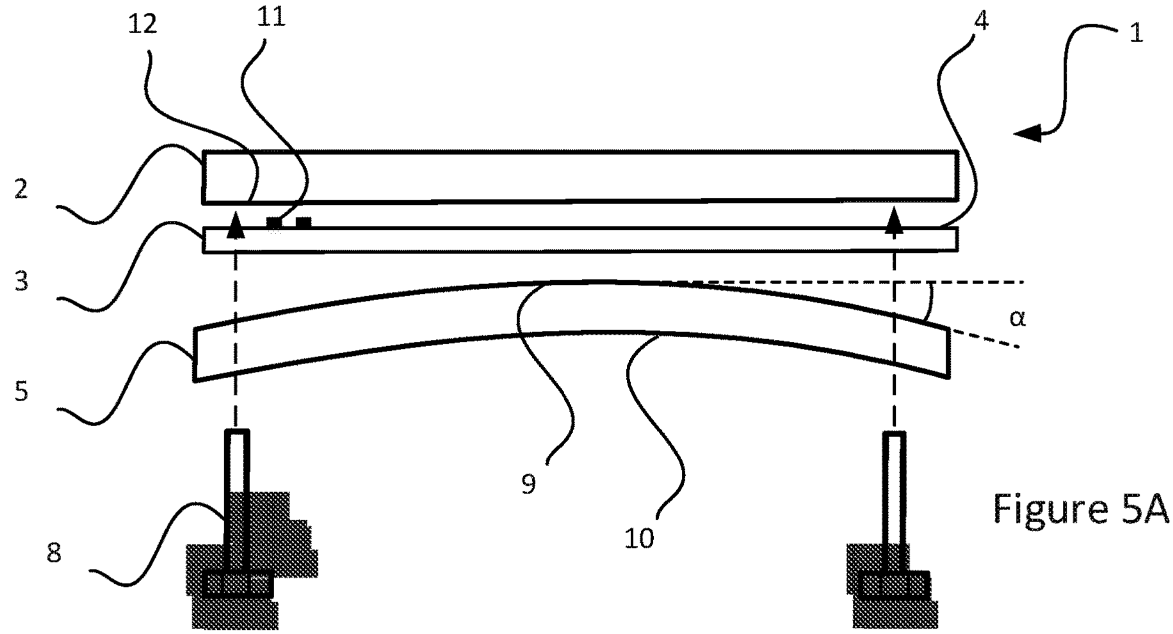
FIG. 5A illustrates from a side view; a metal plate, a sheet of dielectric having an electrical component and an antenna plate, prior to clamping the metal plate to the antenna plate so to transition the metal plate from a first state to a second state in accordance with an embodiment of the present disclosure.
Figure 5B:
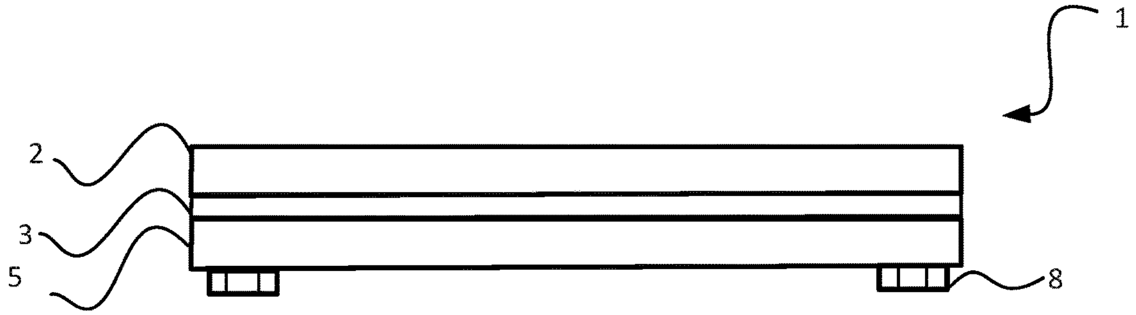
FIG. 5B illustrates from a side view; a clamped metal plate and antenna plate with a sheet of dielectric in-between, in accordance with an embodiment of the present disclosure, wherein the metal plate is in a second flat state.
Figure 5C:
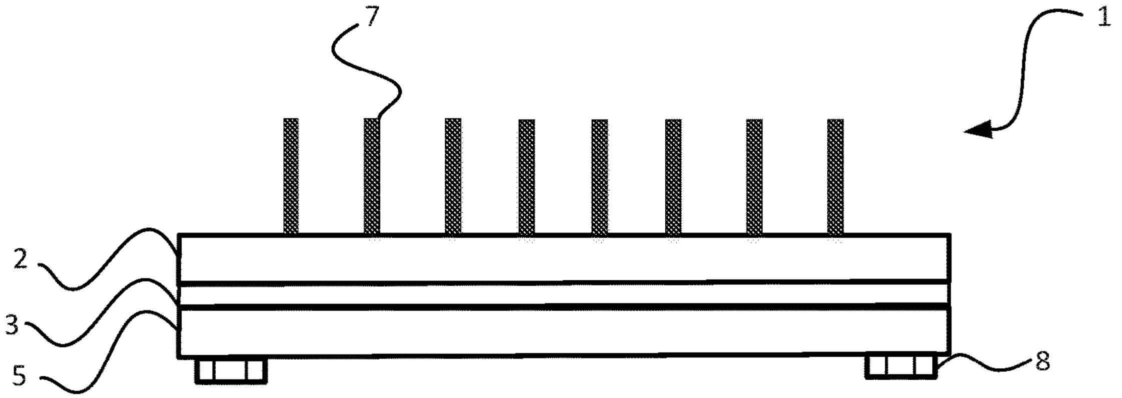
FIG. 5C illustrates from a side view; the antenna structure shown in FIG. 5B, wherein antenna elements are attached to the antenna plate.

FIGS. 5A-5C illustrates the antenna structure 1 in more detail from a side view. FIG. 5A illustrates the antenna structure 1 prior to the step of clamping 104 the metal plate 5 to the antenna plate 2. Further, FIG. 5A illustrates an electrical component 11, the electrical component 11 may be a grounding pad. An embodiment of the present disclosure illustrating a grounding pad on a sheet of dielectric 3 in more detail is shown in FIGS. 6 and 7. FIG. 5B shows the antenna structure 1 after the metal plate 5 has been clamped 104 to the antenna plate 2. Furthermore, FIG. 5C shows when the antenna elements 7 are mounted to the antenna plate 2. The antenna elements 7 in FIG. 5C are seen from a side view i.e. FIG. 5C shows FIG. 1 from a side view.

A thermal interface sheet (see FIG. 7) may be arranged in-between the sheet of dielectric 3 and the metal plate 5. I.e. the method 100 may further comprise the step of, preceding the step of clamping 104, arranging a thermal interface sheet in-between the sheet of dielectric 3 and the metal plate 5. Allowing for the structure to handle different thicknesses of the sheet of dielectric 3, while maintaining a sufficient heat transfer.

The antenna plate 2 of the present disclosure may comprise a first elastic stiffness, wherein the metal plate 5 may comprise a second elastic stiffness, wherein the first stiffness is greater than the second stiffness. This prohibits the antenna plate 2 from deforming during the step of clamping 104 the metal plate 5 and the antenna plate 2.

FIG. 6 illustrates the sheet of dielectric 3 and the antenna plate 2 according to some embodiments of the present disclosure, wherein 'section A' in FIG. 6 illustrates the inner structure of the sheet of dielectric 3 and the antenna plate 2, the inner structures being shown within section A. The first surface 4 of the sheet of dielectric 3 may comprise at least one grounding pad 11 and a through-hole via 23. Further, the antenna plate 2 may comprise at least one radiating section 7' and at least one receiving section 21 extending towards the radiating section 7'. Further, the antenna structure 1 may comprise at least one antenna launch pin 20 for feeding the radiating section 7' with electromagnetic waves, the launch pin 20 comprising a conductive element 20' and a dielectric element 20", wherein the conductive element 20' comprises a first portion 27 comprising a first diameter, the first portion 27 extending towards a second portion 28 comprising a second diameter, the second diameter being greater than the first diameter, wherein the dielectric element 20" sleeves an upper part 27' of the first portion 27 of the conductive element 20', and wherein a lower part 27" of the first portion 27 of the conductive element 20' protrudes from an end portion 30 of the dielectric element 20". Further, the lower part 27" of the conductive element 20' is arranged so to extend through the through-hole via 23, allowing the launch pin 20 to extend perpendicularly from said sheet of dielectric 3. Further, the antenna plate 2 is attached to the sheet of dielectric 3 such that the launch pin 20 extends into the radiating section 7' through the receiving section 21. The conductive element 20' may be metal.

The sheet of dielectric 3 and antenna plate 2 according to FIG. 6 provide an antenna structure 1 as such, which provides an improved space efficiency, assembly and manufacturing convenience. In other words, the antenna structure 1 as such has an improved antenna structure in terms of cost efficiency, manufacturing and assembly.

FIG. 7 illustrates a cut-out cross-sectional view of the antenna structure 1 when assembled. FIG. 7 shows that antenna plate 2 comprises a connecting surface 12 facing the sheet of dielectric 3, the connecting surface 12 comprises a protruding rim 25 associated with the receiving section 21 wherein said protruding rim 25 is in electrical contact with said grounding pad 11. The protruding rim 25 is formed as an extension of the receiving section 21.

The protruding rim 25 combined with the assembly provided by the first and second states of the metal plate 5 allows for an optimal electrical contact between the protruding rim 25 and the grounding pads 11 on the sheet of dielectric 3. Thus, the antenna structure 1 is robust and insensitive against vibrations and other disturbing means.

The launch pin 20 design allows it to be press-fitted into the through-hole via 23, this combined with the assembly of the metal plate 5 to the antenna plate 2 allows for an improved (more efficient) assembly of the antenna structure 1. Further, the launch pin 20 according to the present disclosure provides the benefit of having a small footprint. In other words, the launch pin 20 further improves the space efficiency on the sheet of dielectric 3. In accordance with the present disclosure, the sheet of dielectric 3 is improved in terms of space efficiency.

Further, the launch pin 20 comprising a conductive element 20" formed with two portions 27, 28 with different dimensions allow for a launch pin 20 with less amount of components than a conventionally utilized launch pin 20. Thus, reducing the total amount of components on the antenna arrangement 1. Accordingly, the antenna arrangement 1 according to the present disclosure may significantly reduce the amount of components compared to conventional antenna arrangements, based on that the antenna arrangement 1 firstly, allows for a reduction of fastening means 8 and also reduction in components for the launch pin—this is achieved while simultaneously providing a more convenient structure to manufacture compared to conventional antenna structures.

According to some embodiments, the lower part 27" of the launch pin 20 is attached to the sheet of dielectric 3 by means of soldering from a back surface 26 of the sheet of dielectric 3, the back surface 26 being on an opposite side of the sheet of dielectric 3 relative to the first surface 4.

Further, the dielectric element 20" of the launch pin 20 comprises a third diameter, wherein the third diameter is 2-3 times greater than the first diameter, so to obtain a 50 ohm impedance.

FIGS. 6 and 7 shows slot antenna elements, however the antenna elements 7 may be notch antenna elements 7 or patch antenna elements.

The lower part of the conductive element 20' may form an interference relative the through-hole via 23, so to allow press-fit mounting of the launch pin 20 into the through-hole via 23. Thus, "interference" means the diameter of the lower part of the conductive element 20' is substantially equal to (or slightly smaller) than the through-hole via 23. Allowing the pin 20 to be fastened to the via 23.

Further, the receiving section 21 may be a conical receiving section (as seen in FIGS. 6 and 7) extending towards the radiating section 7' in a tapering manner. This provides for further improvement of the assembly of the antenna structure 1 since the conical receiving section allows for the metal plate 5 to be clamped to the antenna plate 2 without risking that the launch pin 20 isn't received by the receiving section 21. Thus, this allows for a larger tolerance of deviations of the antenna structure, allowing for a more convenient assembly.

FIG. 7 further shows a thermal interface sheet 22 (which may be a phase change material) arranged in-between the sheet of dielectric 3 and the metal plate 5 so to prevent surface variations occurring on the surface of the sheet of dielectric 3 facing the metal plate 5 (e.g. the protruding conductive element from the launch pin 20"). The thermal interface sheet 22 provides the benefit of not hampering the heat transfer between the metal plate 5 (being a cooling plate) and the sheet of dielectric 3.

Accordingly, the FIGS. 6 and 7 shows an improved antenna structure 1 arranged so to provide for a cheap manufacturing, easy assembly while maintaining requirements related to contact pressure in-between the sheet of dielectric 3, antenna plate 2 and the metal plate 5.

FIG. 7 shows an assembled antenna structure 1, wherein the metal plate 5 is in a flat state. Further, a fastening means 8 is clamping/attaching the sheet of dielectric 3 and the antenna plate 2.

Figure 8:
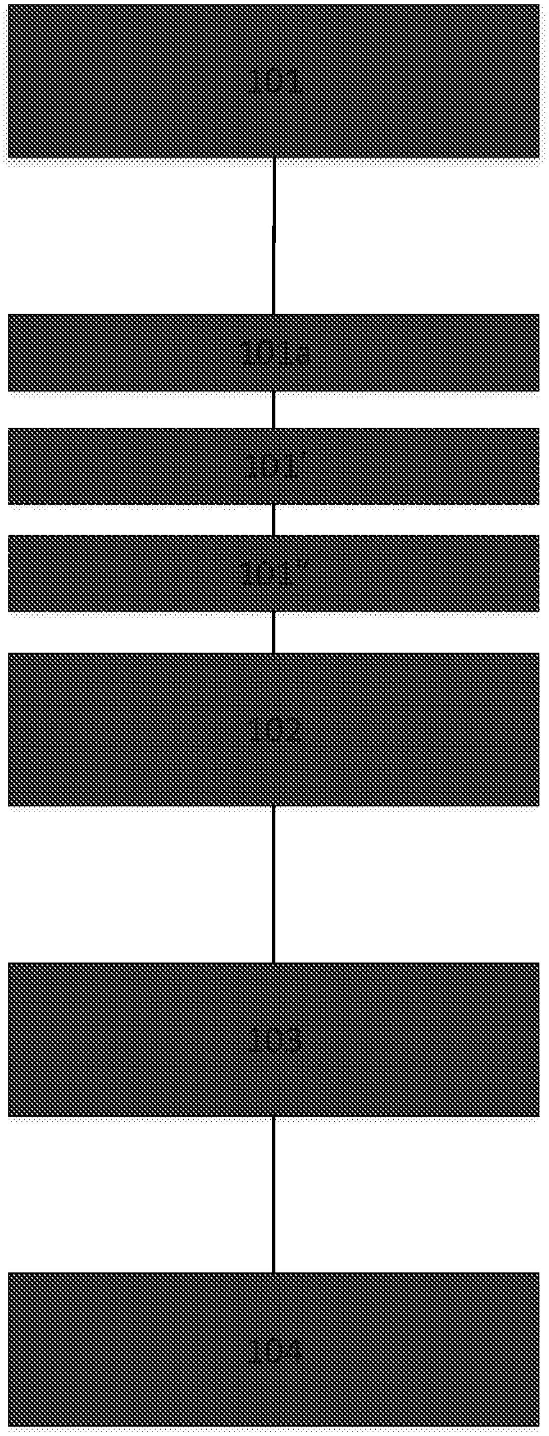
FIG. 8 schematically illustrates the method shown in FIG. 3, further comprising the step of press-fit mounting a launch pin in the sheet of dielectric.

FIG. 8 illustrates the method 100 seen in FIG. 3, further comprising the step of:

inserting 101*a* a launch pin 20 in said through-hole via 23;
wherein said launch pin, comprises a conductive element 20' and a dielectric element 20";
wherein the conductive element 20' comprises a first portion 27 comprising a first diameter, the first portion 27 extending towards a second portion 28 comprising a second diameter, the second diameter being greater than the first diameter;
wherein the dielectric element 20" sleeves an upper part 27' of the first portion 27 of the conductive element 20', and wherein a lower part 27" of the conductive element 20' protrudes from an end portion 30 of the dielectric element 20".

Accordingly, during the step of arranging 103, the receiving section 21 receives said launch pin 20. The launch pin 20 may be inserted 101*a* by means of press-fit. Thus, the step 101*a* may be defined as press-fit mounting a launch pin 20 in said through-hole via 23.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

The invention claimed is:

1. A method for manufacturing an antenna structure, the method comprising the steps of:

providing an antenna plate and a sheet of dielectric comprising at least one electrical component on a first surface of said sheet of dielectric;
forming, by additive manufacturing, a metal plate, wherein the metal plate comprises a cavity structure,
wherein the metal plate further comprises a defined curvature around a central axis traversing a central portion of said metal plate, and
wherein the metal plate comprises an end angle, the end angle being based on an optimal contact-pressure in-between the at least one electrical component and a connecting surface of the antenna plate;
arranging the sheet of dielectric in-between the metal plate and the antenna plate; and
clamping first end portions of the metal plate to second end portions of the antenna plate, so to arrange the metal plate from a first curved state to a second flat state, wherein the end angle is defined, when the metal plate is in a first curved state, between a tangent to a surface of the metal plate at an end portion thereof and a reference line parallel to the connecting surface of the antenna plate.

2. The method according to claim 1, wherein the metal plate is a cooling plate having a first cooling surface and a second cooling surface, wherein the cavity structure is positioned intermediate the first and the second cooling surface, and wherein the cavity structure is arranged to transfer a flow of cooling medium.

3. The method according to claim 1, wherein the optimal contact pressure is in the range of 1-100 kPa.

4. The method according to claim 1, wherein the end angle is in the range of 0.5-3.5 degrees.

5. The method according to claim 1, wherein the at least one electrical component is a grounding pad.

6. The method according to claim 1, wherein the antenna plate comprises a first elastic stiffness, wherein the metal plate comprises a second elastic stiffness, and wherein the first elastic stiffness is greater than the second elastic stiffness.

7. The method according to claim 1, wherein the first end portions of the metal plate and the second end portions of the antenna plate are clamped by means of a fastening means.

8. The method according to claim 1, further comprising the step of, preceding forming the metal plate:

designing a three-dimensional computer aided design, 3D CAD model of the metal plate;

importing the designed 3D CAD model into an additive manufacturing (AM) apparatus.

9. The method according to claim 1, wherein the antenna plate comprises a plurality of antenna elements, wherein the plurality of antenna elements are at least one of slot antenna elements, notch antenna elements, patch antenna elements or any other suitable type of antenna elements.

10. The method according to claim 1, wherein a thermal interface sheet is arranged in-between the sheet of dielectric and the metal plate.

11. The method according to claim 1, wherein the electrical component is a grounding pad, wherein the sheet of dielectric further comprises a through-hole via;

wherein the antenna plate comprises at least one radiating section and at least one receiving section extending towards the radiating section, wherein the method further comprises the step of:

inserting a launch pin in said through-hole via, wherein said launch pin comprises a conductive element and a dielectric element;

wherein the conductive element comprises a first portion comprising a first diameter, the first portion extending towards a second portion comprising a second diameter, the second diameter being greater than the first diameter; and wherein the dielectric element sleeves an upper part of the first portion of the conductive element, and wherein a lower part of the conductive element protrudes from an end portion of the dielectric element.

12. The method according to claim 11, wherein the receiving section is a conical receiving section extending towards the radiating section in a tapering manner, wherein in the step of arranging, the receiving section receives said launch pin.

13. The method according to claim 11, wherein the dielectric element comprises a third diameter, wherein the third diameter is 2-3 times greater than the first diameter, so to obtain a 50 ohm impedance.

14. An antenna structure comprising:

an antenna plate; and a sheet of dielectric comprising at least one electrical component on a first surface of said sheet of dielectric;

a metal plate formed by additive manufacturing, wherein the metal plate comprises a cavity structure, wherein the metal plate further comprises a first curved state and a second flat state, wherein the metal plate comprises an end angle in said first curved state, the end angle being based on an optimal contact-pressure in-between the at least one electrical component and a connecting surface of the antenna plate, wherein said optimal contact-pressure is a pressure required to allow for electrical contact between the electrical component and the connecting surface in said second flat state, wherein the sheet of dielectric is arranged in-between the metal plate and the antenna plate, and wherein first end portions of the metal plate are clamped to second end portions of the antenna plate, the metal plate being in said flat state.

15. The antenna structure according to claim 14, wherein the electrical component is a grounding pad, wherein the sheet of dielectric further comprises a through-hole;

wherein the antenna plate comprises at least one radiating section and at least one receiving section extending towards the radiating section;

wherein the antenna structure further comprises at least one antenna launch pin comprising a conductive element and a dielectric element;

wherein the conductive element comprises a first portion comprising a first diameter, the first portion extending towards a second portion comprising a second diameter, the second diameter being greater than the first diameter;

wherein the dielectric element sleeves an upper part of the first portion of the conductive element, and wherein a lower part of the conductive element protrudes from an end portion of the dielectric element;

wherein the lower part of the conductive element is arranged so to extend through the through-hole via, allowing the launch pin to extend perpendicularly from said sheet of dielectric, and wherein the antenna plate is attached to the sheet of dielectric such that the launch pin extends into the radiating section through the receiving section.

* * * * *